United States Patent
Magara

(10) Patent No.: US 9,836,045 B2
(45) Date of Patent: Dec. 5, 2017

(54) MANUFACTURING APPARATUS CONTROL SYSTEM AND MANUFACTURING APPARATUS CONTROL METHOD

(71) Applicant: Kabushiki Kaisha Toshiba, Minato-ku (JP)

(72) Inventor: Takashi Magara, Meguro (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 665 days.

(21) Appl. No.: 14/478,204

(22) Filed: Sep. 5, 2014

(65) Prior Publication Data

US 2015/0268664 A1    Sep. 24, 2015

(30) Foreign Application Priority Data

Mar. 20, 2014    (JP) .................................. 2014-058717

(51) Int. Cl.
   *G05B 19/418*    (2006.01)

(52) U.S. Cl.
   CPC .................. *G05B 19/41875* (2013.01); *G05B 2219/32177* (2013.01); *G05B 2219/32179* (2013.01); *Y02P 90/14* (2015.11); *Y02P 90/22* (2015.11)

(58) Field of Classification Search
   None
   See application file for complete search history.

(56) References Cited

U.S. PATENT DOCUMENTS

| | | | |
|---|---|---|---|
| 2002/0022937 A1 | 2/2002 | Funakoshi | |
| 2002/0147518 A1* | 10/2002 | Nguyen | G05B 23/0281 700/108 |
| 2004/0124830 A1 | 7/2004 | Tai et al. | |
| 2004/0225396 A1* | 11/2004 | Maeritz | G05B 19/41875 700/109 |
| 2005/0136559 A1* | 6/2005 | Toyofuku | G06Q 10/10 438/12 |
| 2005/0194590 A1 | 9/2005 | Matsushita et al. | |

(Continued)

FOREIGN PATENT DOCUMENTS

| | | |
|---|---|---|
| CN | 1819112 A | 8/2006 |
| CN | 101101266 A | 1/2008 |

(Continued)

OTHER PUBLICATIONS

Office Action dated Jan. 28, 2016 in Korean Patent Application No. 10-2015-0020853 with English translation.

(Continued)

*Primary Examiner* — Tuan Dao
(74) *Attorney, Agent, or Firm* — Oblon, McClelland, Maier & Neustadt, L.L.P.

(57) ABSTRACT

According to one embodiment, a manufacturing apparatus control system includes a defect rate detector, a significant difference tester and a defect determining unit. The defect rate detector extracts a first apparatus passage history having a first defect rate. The defect rate detector detects a third defect rate by excluding a second apparatus passage history having a second defect rate from the first apparatus passage history. The significant difference tester calculates a significant difference test value. The defect determining unit extracts a third apparatus passage history based on the third defect rate and the significant difference test value.

14 Claims, 9 Drawing Sheets

(56) References Cited

U.S. PATENT DOCUMENTS

| | | | |
|---|---|---|---|
| 2006/0162660 A1 | 7/2006 | Shimizu | |
| 2008/0084297 A1 | 4/2008 | Namioka | |
| 2010/0244028 A1* | 9/2010 | Feustel | H01L 22/12 257/48 |
| 2014/0082417 A1* | 3/2014 | Barton | G06F 11/079 714/26 |

FOREIGN PATENT DOCUMENTS

| | | |
|---|---|---|
| JP | 2002-43200 A | 2/2002 |
| JP | 2005-251925 | 9/2005 |
| JP | 2008-71790 A | 3/2008 |
| JP | 2008-217711 A | 9/2008 |
| JP | 2012-18955 A | 1/2012 |
| JP | 2012-220978 A | 11/2012 |
| TW | 200411801 A | 7/2004 |

OTHER PUBLICATIONS

Combined Office Action and Search Report dated Aug. 8, 2016 in Taiwanese Patent Application No. 104106375 with English translation.

\* cited by examiner

| 1 | 2 | 3 | PASSAGE HISTORY | PROCESS 1 NUMBER OF CHIPS INPUT | PROCESS 1→2 PASSAGE PROPORTION | PROCESS 2→3 PASSAGE PROPORTION | NUMBER OF CHIPS | DEFECT RATE | NUMBER OF NG CHIPS | NUMBER OF OK CHIPS |
|---|---|---|---|---|---|---|---|---|---|---|
| A | A | A | AAA | 10000 | 80 | 80 | 6400 | 4.0 | 256 | 6144 |
| A | A | B | AAB | 10000 | 80 | 10 | 800 | 4.0 | 32 | 768 |
| A | A | C | AAC | 10000 | 80 | 10 | 800 | 4.0 | 32 | 768 |
| A | B | A | ABA | 10000 | 10 | 10 | 100 | 4.0 | 4 | 96 |
| A | B | B | ABB | 10000 | 10 | 80 | 800 | 4.0 | 32 | 768 |
| A | B | C | ABC | 10000 | 10 | 10 | 100 | 4.0 | 4 | 96 |
| A | C | A | ACA | 10000 | 10 | 10 | 100 | 4.0 | 4 | 96 |
| A | C | B | ACB | 10000 | 10 | 10 | 100 | 4.0 | 4 | 96 |
| A | C | C | ACC | 10000 | 10 | 80 | 800 | 4.0 | 32 | 768 |
| B | A | A | BAA | 10000 | 10 | 80 | 800 | 1.0 | 8 | 792 |
| B | A | B | BAB | 10000 | 10 | 10 | 100 | 1.0 | 1 | 99 |
| B | A | C | BAC | 10000 | 10 | 10 | 100 | 1.0 | 1 | 99 |
| B | B | A | BBA | 10000 | 80 | 10 | 800 | 1.0 | 8 | 792 |
| B | B | B | BBB | 10000 | 80 | 80 | 6400 | 1.0 | 64 | 6336 |
| B | B | C | BBC | 10000 | 80 | 10 | 800 | 1.0 | 8 | 792 |
| B | C | A | BCA | 10000 | 10 | 10 | 100 | 1.0 | 1 | 99 |
| B | C | B | BCB | 10000 | 10 | 10 | 100 | 1.0 | 1 | 99 |
| B | C | C | BCC | 10000 | 10 | 80 | 800 | 1.0 | 8 | 792 |
| C | A | A | CAA | 10000 | 10 | 80 | 800 | 1.0 | 8 | 792 |
| C | A | B | CAB | 10000 | 10 | 10 | 100 | 1.0 | 1 | 99 |
| C | A | C | CAC | 10000 | 10 | 10 | 100 | 1.0 | 1 | 99 |
| C | B | A | CBA | 10000 | 10 | 10 | 100 | 1.0 | 1 | 99 |
| C | B | B | CBB | 10000 | 10 | 80 | 800 | 1.0 | 8 | 792 |
| C | B | C | CBC | 10000 | 10 | 10 | 100 | 1.0 | 1 | 99 |
| C | C | A | CCA | 10000 | 80 | 10 | 800 | 1.0 | 8 | 792 |
| C | C | B | CCB | 10000 | 80 | 10 | 800 | 1.0 | 8 | 792 |
| C | C | C | CCC | 10000 | 80 | 80 | 6400 | 1.0 | 64 | 6336 |

FIG. 2

| | | | | | | |
|---|---|---|---|---|---|---|
| A | A | A | 64 | 6400 | | 1.00% |
| A | A | B | 8 | 800 | | 1.00% |
| A | A | C | 8 | 800 | | 1.00% |
| A | B | A | 1 | 100 | | 1.00% |
| A | B | B | 8 | 800 | | 1.00% |
| A | B | C | 1 | 100 | | 1.00% |
| A | C | A | 1 | 100 | | 1.00% |
| A | C | B | 1 | 100 | | 1.00% |
| A | C | C | 8 | 800 | | 1.00% |
| B | A | A | 8 | 800 | | 1.00% |
| B | A | B | 1 | 100 | | 1.00% |
| B | A | C | 1 | 100 | | 1.00% |
| B | B | A | 8 | 800 | | 1.00% |
| B | B | B | 64 | 6400 | | 1.00% |
| B | B | C | 8 | 800 | | 1.00% |
| B | C | A | 1 | 100 | | 1.00% |
| B | C | B | 1 | 100 | | 1.00% |
| B | C | C | 8 | 800 | | 1.00% |
| C | A | A | 32 | 800 | | 4.00% |
| C | A | B | 4 | 100 | | 4.00% |
| C | A | C | 4 | 100 | | 4.00% |
| C | B | A | 4 | 100 | | 4.00% |
| C | B | B | 32 | 800 | | 4.00% |
| C | B | C | 4 | 100 | | 4.00% |
| C | C | A | 32 | 800 | | 4.00% |
| C | C | B | 32 | 800 | | 4.00% |
| C | C | C | 256 | 6400 | | 4.00% |

FIG. 5A

| PROCESS 1 | | | |
|---|---|---|---|
| APPARATUS | ABNORMAL NUMBER | NORMAL NUMBER | ABNORMAL VALUE RATE |
| A | 14 | 549 | 2.6% |
| B | 33 | 657 | 5.0% |
| C | 8 | 594 | 1.3% |
| D | 10 | 594 | 1.7% |
| E | 9 | 603 | 1.5% |
| F | 0 | 324 | 0.0% |
| TOTAL | 74 | 3321 | 2.2% |

FIG. 5B

| PROCESS 2 | | | |
|---|---|---|---|
| APPARATUS | ABNORMAL NUMBER | NORMAL NUMBER | ABNORMAL VALUE RATE |
| A | 2 | 621 | 0.3% |
| B | 2 | 702 | 0.3% |
| C | 14 | 657 | 2.1% |
| D | 22 | 666 | 3.3% |
| E | 34 | 675 | 5.0% |
| TOTAL | 74 | 3321 | 2.2% |

FIG. 5C

| PROCESS 3 | | | |
|---|---|---|---|
| APPARATUS | ABNORMAL NUMBER | NORMAL NUMBER | ABNORMAL VALUE RATE |
| A | 10 | 702 | 1.4% |
| B | 6 | 675 | 0.9% |
| C | 8 | 675 | 1.2% |
| D | 8 | 666 | 1.2% |
| E | 42 | 603 | 7.0% |
| TOTAL | 74 | 3321 | 2.2% |

FIG. 5D

| PROCESS 4 | | | |
|---|---|---|---|
| APPARATUS | ABNORMAL NUMBER | NORMAL NUMBER | ABNORMAL VALUE RATE |
| A | 0 | 432 | 0.0% |
| B | 2 | 558 | 0.4% |
| C | 2 | 702 | 0.3% |
| D | 5 | 801 | 0.6% |
| E | 65 | 828 | 7.9% |
| TOTAL | 74 | 3321 | 2.2% |

FIG. 5E

| PROCESS 5 | | | |
|---|---|---|---|
| APPARATUS | ABNORMAL NUMBER | NORMAL NUMBER | ABNORMAL VALUE RATE |
| A | 2 | 144 | 1.4% |
| B | 0 | 207 | 0.0% |
| C | 0 | 585 | 0.0% |
| D | 16 | 711 | 2.3% |
| E | 15 | 783 | 1.9% |
| F | 41 | 891 | 4.6% |
| TOTAL | 74 | 3321 | 2.2% |

FIG. 5F

| PROCESS 6 | | | |
|---|---|---|---|
| APPARATUS | ABNORMAL NUMBER | NORMAL NUMBER | ABNORMAL VALUE RATE |
| A | 2 | 405 | 0.5% |
| B | 5 | 423 | 1.2% |
| C | 4 | 441 | 0.9% |
| D | 14 | 711 | 2.0% |
| E | 21 | 648 | 3.2% |
| F | 28 | 693 | 4.0% |
| TOTAL | 74 | 3321 | 2.2% |

|  | PROCESS 4 | | | | | |
|---|---|---|---|---|---|---|
| | APPARATUS | A | B | C | D | E | TOTAL |
| PROCESS 3 | A | 405 | 135 | 72 | 45 | 45 | 702 |
| | B | 27 | 396 | 171 | 72 | 9 | 675 |
| | C | --- | 18 | 423 | 171 | 63 | 675 |
| | D | --- | | 27 | 504 | 126 | 666 |
| | E | --- | --- | 9 | 9 | 585 | 603 |
| | TOTAL | 432 | 558 | 702 | 801 | 828 | 3321 |

FIG. 6

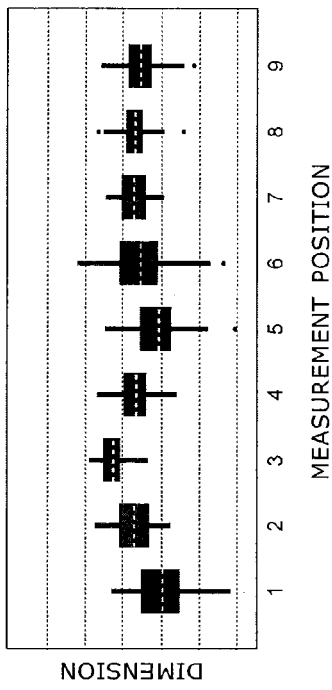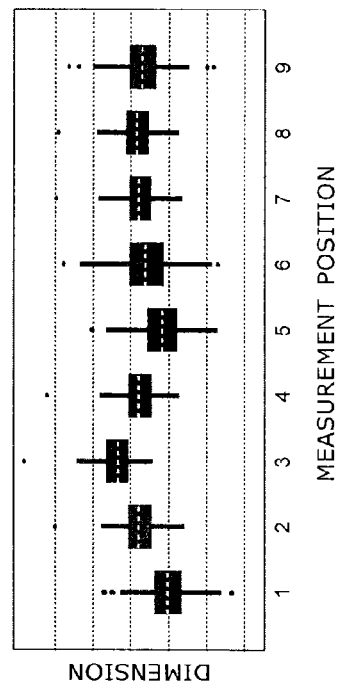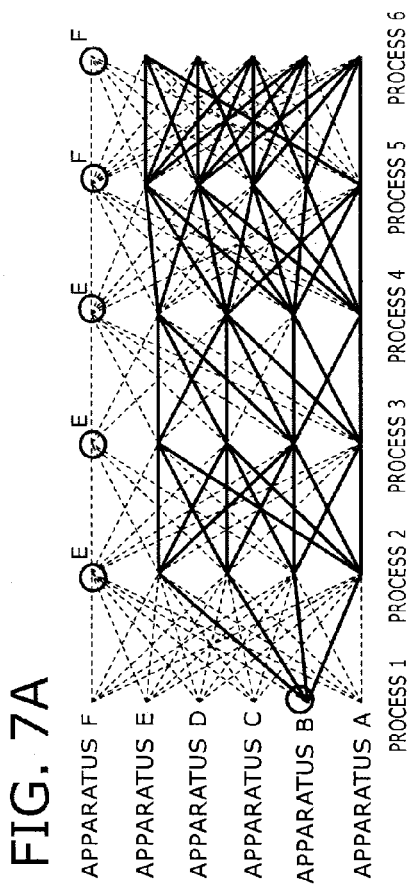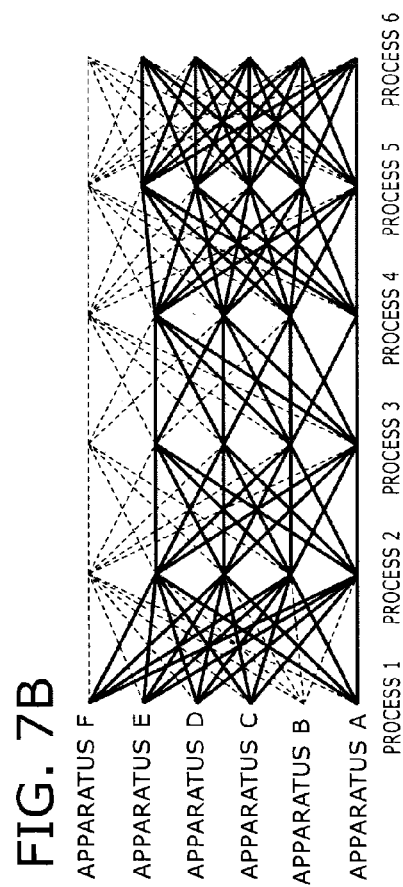
FIG. 7A
FIG. 7B

MANUFACTURING APPARATUS CONTROL SYSTEM AND MANUFACTURING APPARATUS CONTROL METHOD

CROSS-REFERENCE TO RELATED APPLICATIONS

This application is based upon and claims the benefit of priority from the Japanese Patent Application No. 2014-058717, filed on Mar. 20, 2014; the entire contents of which are incorporated herein by reference.

FIELD

Embodiments described herein relate generally to a manufacturing apparatus control system and a manufacturing apparatus control method.

BACKGROUND

In the manufacturing processes of a semiconductor device, etc., each process is executed using different apparatuses for each lot or wafer. In the case where each process is executed by different apparatuses, the apparatus passage history is used to analyze defect causes.

Fast algorithms are used as methods for analyzing defect causes. There are cases where the manufacturing processes of the semiconductor device, etc., include several hundred processes; and the number of combinations of the apparatus passage history is enormous. A high-precision and high-speed method for controlling the manufacturing apparatuses is desirable.

BRIEF DESCRIPTION OF THE DRAWINGS

FIG. 2 shows a data table;

FIG. 5A to FIG. 5F show abnormal value rates by process;

FIG. 6 shows correlation between processing histories;

FIG. 7A and FIG. 7B show the abnormal value rates;

DETAILED DESCRIPTION

Figure 1:
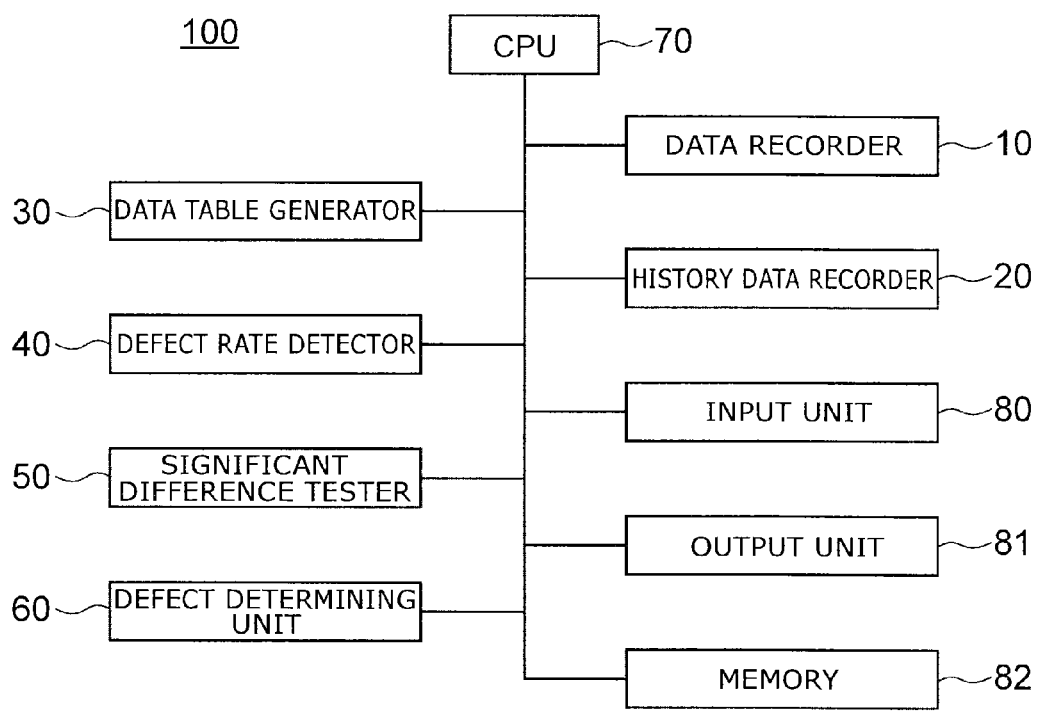
FIG. 1 is a schematic view showing a manufacturing apparatus control system according to the embodiment.

According to one embodiment, a manufacturing apparatus control system includes a defect rate detector, a significant difference tester and a defect determining unit. The defect rate detector extracts a first apparatus passage history having a first defect rate. The defect rate detector detects a third defect rate by excluding a second apparatus passage history having a second defect rate from the first apparatus passage history. The significant difference tester calculates a significant difference test value. The defect determining unit extracts a third apparatus passage history based on the third defect rate and the significant difference test value.

Embodiments of the invention will now be described with reference to the drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

Embodiment

FIG. 1 is a schematic view showing a manufacturing apparatus control system according to the embodiment.

As shown in FIG. 1, a data recorder 10, a history data recorder 20, a data table generator 30, a defect rate detector 40, a significant difference tester 50, a defect determining unit 60, a CPU 70, an input unit 80, an output unit 81, and a memory 82 are provided in the manufacturing apparatus control system 100.

The data recorder 10 is, for example, a memory device that records the product ID, the lot ID, etc., of products manufactured by multiple apparatuses and processes.

The history data recorder 20 is a memory device that records history data such as the product ID, the lot ID, the process ID, the apparatus ID, the processing time, etc., and the relationships between these items. The history data recorder 20 records the passage history when passing through the processes, the number of chips before and after passing through the process, the passage proportion of each process, the number of non-defective chips, the number of defective chips, the defect rate, etc. The data recorder 10 may include the history data recorder 20.

The data table generator 30 acquires the data from the data recorder 10 and the history data recorder 20 and generates the data table. The products, processes, intervals, etc., for which the data is to be acquired is preset. The data from the data recorder 10 and the history data recorder 20 is automatically acquired; and one data table is generated by linking the data of both the data recorder 10 and the history data recorder 20 based on the product ID, the data ID, etc. By referring to the data table, the apparatuses that were used and whether or not the quality of the lot was appropriate can be ascertained for the manufacturing processes of the lot of the product that was produced.

FIG. 2 shows a data table.

FIG. 2 shows a specific example of a data table generated by the data table generator 30. The data table generator 30 generates a table of data such as the passage history when passing through the processes, the number of chips before and after passing through each process, the passage proportion of each process, the number of non-defective chips, the number of defective chips, the defect rate, etc.

The defect rate detector 40 extracts an apparatus passage history having a high defect rate from the list of the defect rates generated by the data table generator 30. The defect rate detector 40 extracts a first apparatus passage history having a first defect rate. A fast algorithm such as an Apriori method or the like is used as the algorithm that extracts the apparatus passage history.

Figure 3A:
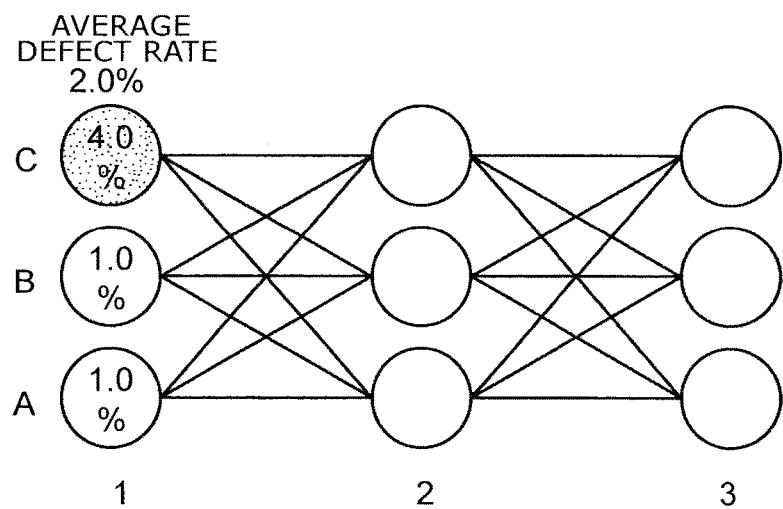
FIG. 3A and FIG. 3B show an apparatus passage history.
Figure 3B:
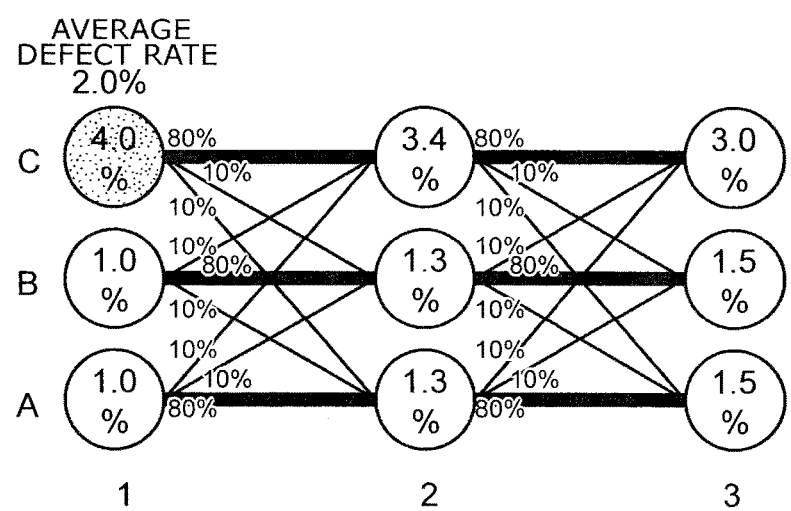

FIG. 3A and FIG. 3B show the apparatus passage history.

FIG. 3A shows the defect rate (%) of each process in the case where there is no correlation between the apparatus histories. FIG. 3B shows the defect rate (%) of each process in the case where there is a correlation between the apparatus histories.

In the drawings, the symbol "A," the symbol "B," and the symbol "C," respectively refer to apparatus A, apparatus B, and apparatus C. Apparatus A, apparatus B, and apparatus C are, for example, semiconductor manufacturing apparatuses.

For example, the semiconductor manufacturing apparatuses include ion implantation apparatuses, impurity diffusion apparatuses, thermal oxidation apparatuses, chemical vapor deposition (CVD) apparatuses, heat treatment apparatuses, sputtering apparatuses, vacuum vapor deposition apparatuses, plating apparatuses, chemical mechanical polishing (CMP) apparatuses, dry or wet etching apparatuses, cleaning apparatuses, exposure apparatuses, dicing apparatuses, bonding apparatuses, etc.

In the figures, the symbol "1," the symbol "2," and the symbol "3" respectively refer to process 1, process 2, and process 3. Process 1, process 2, and process 3 refer to, for example, each process executed by each apparatus. The numbers between the processes in FIG. 3B indicate the allotment ratios (%) of the chips, etc.

As shown in FIG. 3A, the apparatus allotment is executed randomly. There is no bias between the apparatus passage histories. For example, the defect rate of process 1 of apparatus A is 1.0%. The defect rate of process 1 of apparatus B is 1.0%. The defect rate of process 1 of apparatus C is 4.0%. The average defect rate of process 1 is 2.0%.

As shown in FIG. 3B, there is a bias between the apparatus passage histories. For example, the defect rate of process 1 of apparatus A is 1.0%. The defect rate of process 1 of apparatus B is 1.0%. The defect rate of process 1 of apparatus C is 4.0%. The average defect rate of process 1 is 2.0%.

For example, the defect rate of process 2 of apparatus A is 1.3%. The defect rate of process 2 of apparatus B is 1.3%. The defect rate of process 2 of apparatus C is 3.4%. For example, the defect rate of process 3 of apparatus A is 1.5%. The defect rate of process 3 of apparatus B is 1.5%. The defect rate of process 3 of apparatus C is 3.0%.

In the case where there is a bias (a correlation) between the apparatus passage histories, the defect rate of a designated history of multiple processes becomes high even when the defect cause is in a single process (e.g., process 1 of apparatus C).

The defect rate detector 40 detects a defect rate P1 relating to an extracted apparatus passage history having a high defect rate by excluding the passage histories of the apparatuses having high defect rates for the other processes. The defect rate detector 40 detects a third defect rate by excluding a second apparatus passage history having a second defect rate from the first apparatus passage history. The third defect rate corresponds to the defect rate P1.

Figures 4A, 4B:
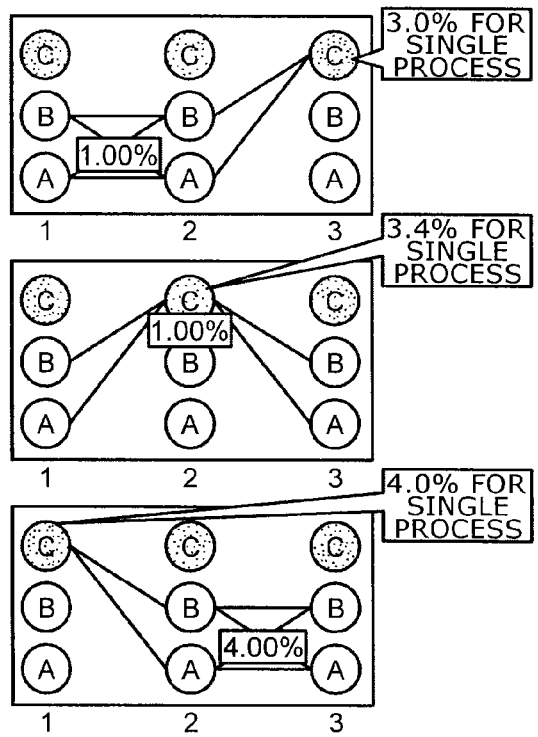
FIG. 4A and FIG. 4B show a method for detecting the defect rate relating to the apparatus passage history.

FIG. 4A and FIG. 4B show the method for detecting the defect rate relating to the apparatus passage history.

FIG. 4A and FIG. 4B show the method for detecting the defect rate P1 in the case where there is a correlation in the apparatus passage history as shown in FIG. 3B. FIG. 4A shows a portion of the data table. FIG. 4B shows a portion of the apparatus passage history.

For example, the defect rate detector 40 narrows down a candidate of the defect-causing process based on the defect rates of the wafers processed with a history having a high defect rate for only one process. The defect rate detector 40 further extracts and narrows down the extracted apparatus passage history having the high defect rate by excluding the passage histories of the apparatuses having high defect rates for the other processes.

As shown in FIG. 4A and FIG. 4B, for example, the history B-B-C, the history B-A-C, the history A-B-C, and the history A-A-C are further extracted from all of the apparatus passage histories. The history B-C-B, the history B-C-A, the history A-C-B, and the history A-C-A are further extracted from all of the apparatus passage histories. The history C-B-B, the history C-B-A, the history C-A-B, and the history C-A-A are further extracted from all of the apparatus passage histories.

The defect rate of process 1 of apparatus C is 4.0%. The defect rate of process 2 of apparatus C is 3.4%. The defect rate of process 3 of apparatus C is 3.0%. The history C-C-C is not extracted because the apparatuses having high defect rates in the other processes are passed through. The history B-B-B and the history A-A-A are not extracted because these histories correspond to histories having low defect rates. A threshold T1 (a first threshold) may be used when extracting the designated history from all of the apparatus passage histories.

The defect rates P1 that relate to the history B-B-C, the history B-A-C, the history A-B-C, the history A-A-C, the history B-C-B, the history B-C-A, the history A-C-B, the history A-C-A, the history C-B-B, the history C-B-A, the history C-A-B, and the history C-A-A are calculated.

For example, the significant difference tester 50 detects a significant difference test value P2. For example, the significant difference tester 50 calculates the feature quantity frequency distributions divided into the occurrence/nonoccurrence of defective patterns by shot region unit or chip unit and determines the occurrence/nonoccurrence of a significant difference between the frequency distributions divided into the occurrence/nonoccurrence of defective patterns. A calculation example of the significant difference test value P2 by the significant difference tester 50 will now be described.

The significant difference tester 50 correlates the apparatus parameter waveform feature quantities and defective patterns having defective pattern classification numbers using the product name, the lot number, the wafer number, the chip number, and the shot number as common items.

The significant difference tester 50 sets a shot region where a defective pattern having a defective pattern classification number exists as an "abnormal shot" and sets a shot region where a defective pattern does not exist as a "normal shot". The significant difference tester 50 calculates, for the apparatus parameter waveform feature quantities, the frequency distributions due to the occurrence/nonoccurrence of defective patterns, i.e., the frequency distributions divided into normal shots and abnormal shots of the defective pattern classification numbers.

The significant difference tester 50 calculates the significant difference test value P2 by executing a significant difference test between the frequency distributions divided into abnormal shots and normal shots of the apparatus parameter waveform feature quantities for all of the combinations of the apparatus parameter waveform feature quantities and the defective pattern classification numbers. For example, the significant difference tester 50 determines that there is a significant difference in the case where the significant difference test value P2 is not more than a prescribed threshold T2 (a second threshold).

The defect determining unit 60 determines the defect cause based on the defect rate P1 detected by the defect rate detector 40 and the significant difference test value P2 detected by the significant difference tester 50. For example, the defect determining unit 60 extracts the apparatus passage history that is the defect cause in the case where the defect rate P1 is not less than the threshold T1 and the significant difference test value P2 is not more than the threshold T2. The defect determining unit 60 determines the defect cause. The defect determining unit 60 extracts the third apparatus passage history based on the third defect rate and the significant difference test value.

Each component inside the manufacturing apparatus control system 100 is controlled by, for example, the CPU (the central processing unit) 70. The CPU 70 is connected to the input unit 80, the output unit 81, the memory 82, etc. The input unit 80 is, for example, a device such as a keyboard, a mouse, etc. The output unit 81 is, for example, a display device. The memory 82 is, for example, ROM (Read Only Memory) that stores a program for causing the CPU to execute operations and the like, RAM (Random Access Memory) that temporarily stores data partway through the calculations, partway through the analysis, etc.

FIG. 5A to FIG. 5F show abnormal value rates by process.

FIG. 6 shows the correlation between the processing histories.

FIG. 5A to FIG. 5F show, for example, the abnormal number (e.g., the number of abnormal chips), the normal number (e.g., the number of normal chips), and the abnormal value rate for apparatuses A to E and processes 1 to 6. FIG. 5A to FIG. 5F correspond to processes 1 to 6, respectively. FIG. 6 shows the normal number for apparatuses A to E in the case where there is a bias (a correlation) between process 3 and process 4.

In process 1, the abnormal value rate of apparatus B is 5.0%. In process 2, the abnormal value rate of apparatus E is 5.0%. In process 3, the abnormal value rate of apparatus E is 7.0%. In process 4, the abnormal value rate of apparatus E is 7.9%. In process 5, the abnormal value rate of apparatus F is 4.6%. In process 6, the abnormal value rate of apparatus F is 4.0%.

The abnormalities concentrate in a designated apparatus, and the abnormal value rate of the designated apparatus is high. For example, in process 1, the abnormal value rate of apparatus B is high. In processes 2 to 6, the abnormal value rate of apparatus E or apparatus F is high.

In the case where apparatus E is set to be the designated apparatus, if there is a bias (a correlation) between the processing histories, the abnormal value rate is affected by the processing history of the other processes. In the case where there is a bias between the processing histories as illustrated by thick lines of FIG. 6, the abnormalities concentrate in the designated apparatus; and the abnormal value rate of the designated apparatus is high.

FIG. 7A and FIG. 7B show the abnormal value rates.

FIG. 8A to FIG. 8G show the abnormal value rates.

FIG. 7A shows the passage history and the trend in the surface in the case where process 1 is processed by the designated apparatus B and processes 2 to 6 are processed by the apparatuses other than the designated apparatuses. FIG. 7B shows the passage history and the trend in the surface in the case where processes 1 to 6 are processed by the apparatuses other than the designated apparatuses.

In the passage histories shown on the left side of FIG. 7A and FIG. 7B, the vertical axis shows apparatuses A to F. The horizontal axis shows processes 1 to 6. The lower side of the vertical axis is apparatus A. The upper side of the vertical axis is different between each process, and is apparatus E or apparatus F. For the trend in the surface shown on the right sides of FIG. 7A and FIG. 7B, the vertical axis is the dimension. The horizontal axis is the measurement position.

Figure 8C:
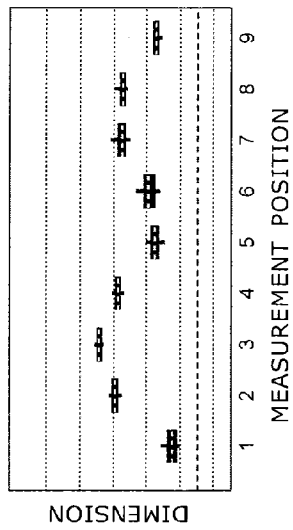
FIG. 8A to FIG. 8G show the abnormal value rates.
Figure 8F:
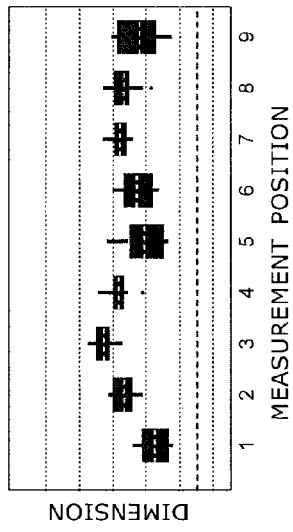
Figure 8B:
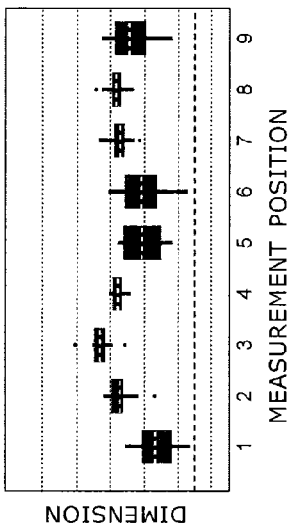
Figure 8E:
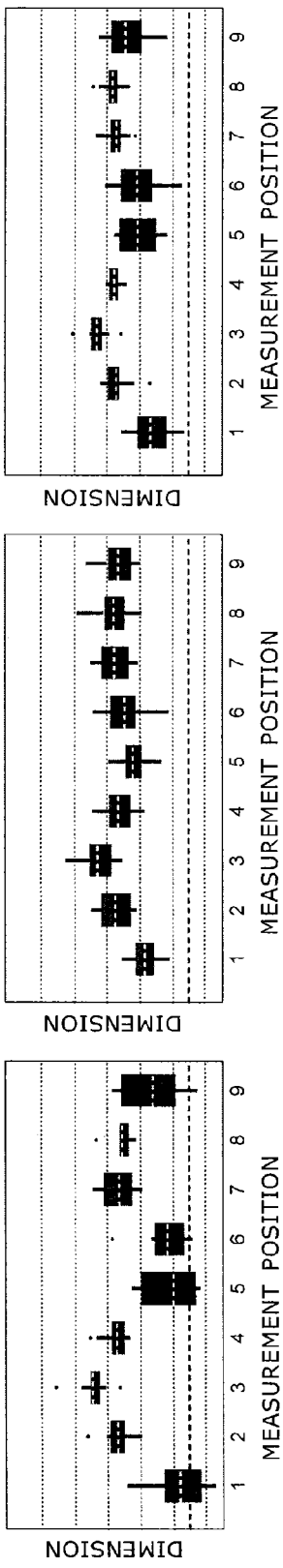
Figure 8A:
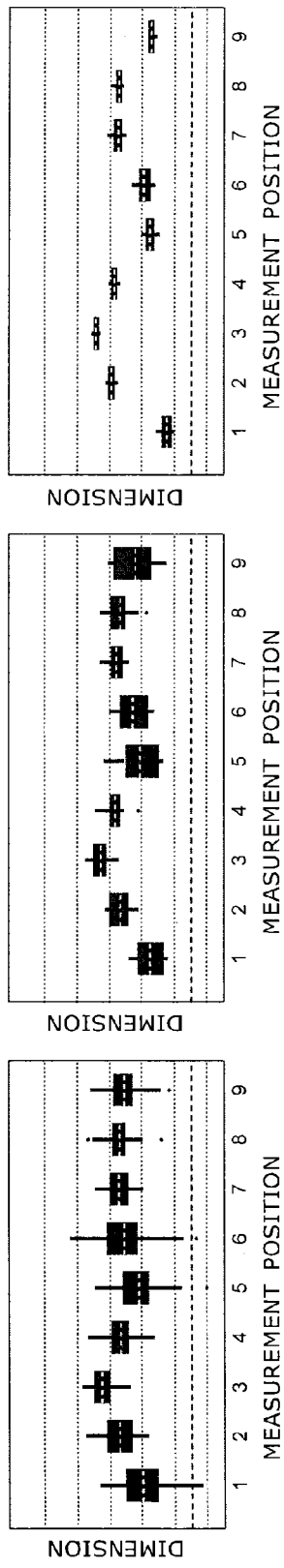
Figure 8D:
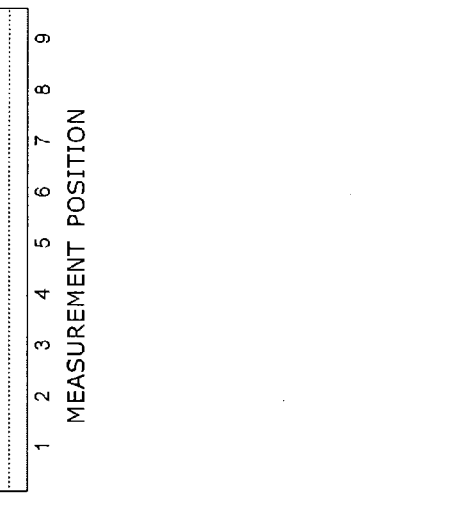
Figure 8G:
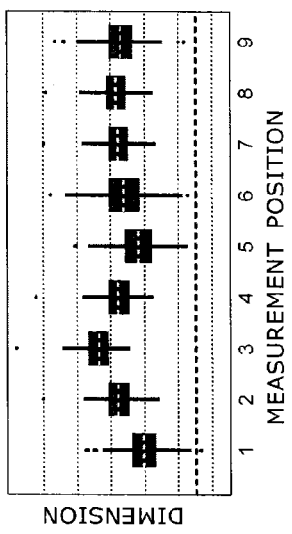

FIG. 8A shows the trend in the surface in the case where process 1 is processed by the designated apparatus B, and the other processes are processed by the apparatuses other than the designated apparatuses. FIG. 8B shows the trend in the surface in the case where process 2 is processed by the designated apparatus E, and the other processes are processed by the apparatuses other than the designated apparatuses. FIG. 8C shows the trend in the surface in the case where process 3 is processed by the designated apparatus E, and the other processes are processed by the apparatuses other than the designated apparatuses. FIG. 8D shows the trend in the surface in the case where process 4 is processed by the designated apparatus E, and the other processes are processed by the apparatuses other than the designated apparatuses. FIG. 8E shows the trend in the surface in the case where process 5 is processed by the designated apparatus F, and the other processes are processed by the apparatuses other than the designated apparatuses. FIG. 8F shows the trend in the surface in the case where process 6 is processed by the designated apparatus F, and the other processes are processed by the apparatuses other than the designated apparatuses. FIG. 8G shows the trend in the surface in the case where processes 1 to 6 are processed by the apparatuses other than the designated apparatuses. The trend in the surface for FIG. 7A and FIG. 7B corresponds to the trend in the surface for FIG. 8A and FIG. 8G.

For the trend in the surface shown in FIG. 8A to FIG. 8G, the vertical axis is the dimension. The horizontal axis is the measurement position.

In the case where process 1 is processed by the designated apparatus B, the abnormal value rate is 0.9%. In the case where processes 1 to 6 are processed by the apparatuses other than the designated apparatuses, the abnormal value rate is 0.1%. The trend in the surface is similar to those of FIG. 7A and FIG. 7B.

In the case where process 2 is processed by the designated apparatus E, the abnormal value rate is 0%. The trend in the surface is similar to that of FIG. 8B. In the case where process 3 is processed by the designated apparatus E, the abnormal value rate is 0%. The trend in the surface is similar to that of FIG. 8C.

In the case where process 4 is processed by the designated apparatus E, the abnormal value rate is 8.6%. The trend in the surface is similar to that of FIG. 8D. In the case where process 5 is processed by the designated apparatus F, the abnormal value rate is 0%. The trend in the surface is similar to that of FIG. 8E. In the case where process 6 is processed by the designated apparatus F, the abnormal value rate is 0%. A trend in the surface such as that of FIG. 8F is shown.

The abnormal value rate of FIG. 8D is higher than the other abnormal value rates. The processing by apparatus E of process 4 is used as the cause candidate of the abnormality occurrence.

The semiconductor manufacturing processes include several hundred processes, and operations for multiple semiconductor devices are performed. The number of different apparatus passage history combinations for each lot or wafer is enormous. When executing history analysis as a method for analyzing defect causes, the calculation time is long for methods that comprehensively calculate the defect rate for each history combination.

Methods for reducing the calculation time include fast algorithms. Because the number of possible combinations is enormous, it is difficult to confirm all of the combinations. A significant difference test value is used as a reference for performing the confirmation preferentially. In the case where the correlation between the passage histories is high and the defect rate is significantly high when passing through some apparatus, histories that should not be extracted get confirmed as high-priority combinations by using the reference of the significant difference test value.

In the embodiment, the apparatus passage history that has a high defect rate is extracted using a fast algorithm, the defect rate P1 when excluding the histories passing through the apparatuses having high defect rates in the other processes is calculated, and the history having a small significant difference test value P2 and a high defect rate P1 is extracted as the defect cause. The extraction of histories that are not the defect cause can be reduced.

The extraction of the apparatus passage histories that are not the defect cause is suppressed by extracting the apparatus passage history using not only the defect rate for each apparatus passage history but also the defect rate considering the correlation of the apparatus passage histories as a reference.

According to the embodiment, a high-precision and high-speed manufacturing apparatus control system is provided.

Figure 9:
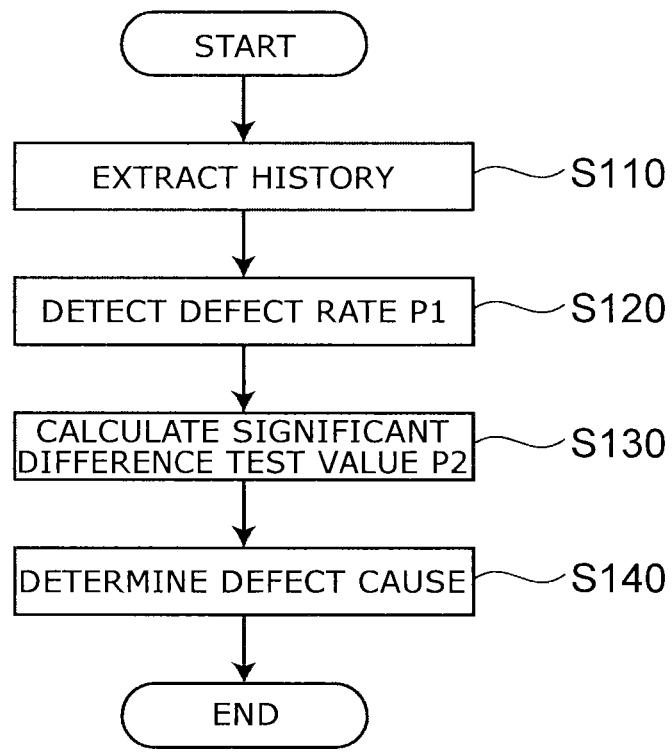
FIG. 9 is a flowchart showing a manufacturing apparatus control method according to the embodiment.

FIG. 9 is a flowchart showing the manufacturing apparatus control method according to the embodiment.

An apparatus passage history having a high defect rate is extracted (step S110). A fast algorithm such as an Apriori method or the like is used as the algorithm that extracts the apparatus passage history. The first apparatus passage history that has the first defect rate is extracted.

The defect rate P1 that relates to the apparatus passage history when excluding the passage histories of the apparatuses having the high defect rates from the extracted apparatus passage history having the high defect rate is detected (step S120). The threshold T1 may be used when extracting the designated history from all of the apparatus passage histories. The third defect rate when the second apparatus passage history having the second defect rate is excluded from the first apparatus passage history is detected.

The significant difference test value P2 is calculated (step S130). The significant difference tester 50 determines that there is a significant difference in the case where the significant difference test value P2 is not more than the threshold T2.

The defect cause is determined based on the defect rate P1 and the significant difference test value P2 (step S140). For example, the defect determining unit 60 extracts the apparatus passage history that is the defect cause in the case where the defect rate P1 is not less than the threshold T1 and the significant difference test value P2 is not more than the threshold T2. The defect determining unit 60 determines the defect cause. The defect determining unit 60 extracts the third apparatus passage history based on the third defect rate and the significant difference test value.

According to the embodiment, a high-precision and high-speed manufacturing apparatus control method is provided.

Also, a processing method is within the scope of the embodiment described above when the processing method includes storing, in a storage medium, a program that causes the configuration of the embodiment described above to operate so that the functions of the embodiment described above are realized (e.g., a program that executes the processing of FIG. 9), reading the program that is stored in the storage medium as code, and causing a computer to execute the code. Computer-readable recording media are within the scope of the embodiment. The storage medium in which the computer program described above is stored and the computer program itself are included in the embodiment described above.

For example, a floppy (registered trademark) disk, a hard disk, an optical disk, a magneto-optical disk, CD-ROM, a magnetic tape, a nonvolatile memory card, ROM, etc., may be used as the recording medium.

The processing of the program that is stored in the recording medium described above is not limited to being executed as a single body; and examples in which the operations of the embodiment described above are executed by operating on an OS in cooperation with other software and functions of an extension board also are within the scope of the embodiment described above.

According to the embodiment, a high-precision and high-speed manufacturing apparatus control system and manufacturing apparatus control method are provided.

Hereinabove, embodiments of the invention are described with reference to specific examples. However, the invention is not limited to these specific examples. For example, one skilled in the art may similarly practice the invention by appropriately selecting specific configurations of components included in the manufacturing apparatus control system such as the data recorder, the history data recorder, the data table generator, the defect rate detector, the significant difference tester, the defect determining unit, the CPU, the input unit, the output unit, the memory, etc., from known art; and such practice is within the scope of the invention to the extent that similar effects can be obtained.

Moreover, combinations of two or more components in the specific examples within a technically feasible range are also included in the scope of the invention as long as the spirit of the invention is included.

In addition, any manufacturing apparatus control system and manufacturing apparatus control method, which those skilled in the art can carry out by making appropriate design modifications based on the manufacturing apparatus control system and the manufacturing apparatus control method described above as the embodiments of the invention, are also in the scope of the invention as long as the spirit of the invention is included.

Also, within the scope of principles of the invention, various changes and modifications will be readily made by those skilled in the art. Accordingly, it will be appreciated that such changes and modifications also fall within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A manufacturing apparatus control system controlling a manufacturing apparatus which includes a plurality of apparatuses each executing a plurality of processes, comprising:

circuitry configured to extract a first apparatus passage history from a first process of the processes and detect a third defect rate which is directed to a defect rate of an apparatus passage history generated by excluding a second apparatus passage history from the first apparatus passage history based on a process other than the first process in the processes, the first apparatus passage history having a first defect rate, the second apparatus passage history having a second defect rate;

calculate a significant difference test value based on frequency distributions of an occurrence/nonoccurrence of defective patterns by at least pattern classifications of the defective patterns; and extract a third apparatus passage history from the apparatus passage history generated by excluding the second apparatus passage history from the first apparatus passage history, based on the third defect rate and the significant difference test value.

2. The system according to claim 1, wherein the circuitry is configured to detect the third defect rate based on a first threshold.

3. The system according to claim 2, wherein the circuitry is configured to calculate the significant difference test value based on a second threshold.

4. The system according to claim 3, wherein the circuitry is configured to extract the third apparatus passage history based on the first threshold and the second threshold.

5. The system according to claim 4, wherein the circuitry is configured to extract the third apparatus passage history as a defect cause in the case where the third defect rate is not less than the first threshold and the significant difference test value is not more than the second threshold.

6. The system according to claim 1, wherein the circuitry is further configured to generate a data table relating to a defect rate and an apparatus passage history.

7. The system according to claim 6, wherein the circuitry is configured to extract the first apparatus passage history and the second apparatus passage history from the data table.

8. A manufacturing apparatus control method controlling a manufacturing apparatus which includes a plurality of apparatuses each executing a plurality of processes, comprising:

extracting a first apparatus passage history from a first process of the processes, the first apparatus passage history having a first defect rate;

detecting a third defect rate which is directed to a defect rate of an apparatus passage history generated by excluding a second apparatus passage history from the first apparatus passage history based on a process other than the first process in the processes, the second apparatus passage history having a second defect rate;

calculating a significant difference test value based on frequency distributions of an occurrence/nonoccurrence of defective patterns by at least pattern classifications of the defective patterns; and extracting a third apparatus passage history from the apparatus passage history generated by excluding the second apparatus passage history from the first apparatus passage history, based on the third defect rate and the significant difference test value.

9. The method according to claim 8, wherein the third defect rate is detected based on a first threshold.

10. The method according to claim 9, wherein the significant difference test value is calculated based on a second threshold.

11. The method according to claim 10, wherein the third apparatus passage history is extracted based on the first threshold and the second threshold.

12. The method according to claim 11, wherein the third apparatus passage history is extracted as a defect cause in the case where the third defect rate is not less than the first threshold and the significant difference test value is not more than the second threshold.

13. The method according to claim 8, wherein the first apparatus passage history is extracted from a data table relating to a defect rate and an apparatus passage history.

14. The method according to claim 13, further comprising extracting the second apparatus passage history from the data table.

* * * * *